United States Patent [19]

Upson et al.

[11] 4,294,739

[45] Oct. 13, 1981

[54] ANTISTATIC COMPOSITIONS COMPRISING CROSSLINKABLE LATEX BINDERS

[75] Inventors: Donald A. Upson; Gerald A. Campbell, both of Webster; Diane E. Kestner, Hilton, all of N.Y.

[73] Assignee: Eastman Kodak Company, Rochester, N.Y.

[21] Appl. No.: 33,617

[22] Filed: Apr. 26, 1979

[51] Int. Cl.³ ............................................. C08L 35/06
[52] U.S. Cl. ........................... 260/29.6 RW; 252/500; 260/29.6 WB; 260/29.7 UA; 260/29.7 W; 430/70; 430/285; 430/527; 430/528; 428/519; 428/520
[58] Field of Search ............. 260/29.6 RW, 29.6 WB, 260/29.7 D, 29.7 W, 29.7 UA; 96/87 A; 252/500; 430/70, 285, 527, 528

[56] References Cited

U.S. PATENT DOCUMENTS

| | | | |
|---|---|---|---|
| 3,399,995 | 9/1968 | Winchell | 96/87 A |
| 3,674,711 | 7/1972 | Growald | 260/17.4 ST |
| 3,856,530 | 12/1974 | Van Paesschen | 96/87 A |
| 3,887,496 | 6/1975 | Cornier | 252/500 |
| 4,007,148 | 2/1977 | Ginter | 260/29.6 WB |
| 4,010,117 | 3/1977 | Maruhashi | 96/87 A |
| 4,011,080 | 3/1977 | McCabe | 96/87 A |
| 4,011,176 | 3/1977 | Saunders | 252/500 |
| 4,061,833 | 12/1977 | Pelletier | 260/29.6 WB |
| 4,070,189 | 1/1978 | Kelley | 96/87 A |

OTHER PUBLICATIONS

Polymer Handbook, 2nd Edition, 1975, pp. V-7, V-8, V-9.

*Primary Examiner*—Paul R. Michl
*Attorney, Agent, or Firm*—J. R. Everett

[57] ABSTRACT

A coating composition useful in forming conductive layers comprises a conductive, water-dispersible, particulate polymer and a crosslinkable latex binder. The crosslinkable latex has a first glass transition temperature before crosslinking of substantially less than 50° C. and a second glass transition temperature after crosslinking and coalescing of substantially greater than 50° C. wherein the first and second glass transition temperatures differ by more than 4° C. The coating composition can be coated on a variety of supports to produce conductive elements. The coating compositions are particularly useful in forming photographic elements which are resistant to the buildup of static charge and ferrotyping.

25 Claims, No Drawings

ANTISTATIC COMPOSITIONS COMPRISING CROSSLINKABLE LATEX BINDERS

FIELD OF THE INVENTION

The present invention relates to new conductive compositions and elements. More specifically, the conductive compositions of the present invention are dispersions of water-dispersible, particulate polymers in hydrophobic, crosslinkable latex binders. Photographic elements having coalesced and crosslinked layers of the described conductive compositions form another aspect of the present invention.

DESCRIPTION RELATIVE TO THE PRIOR ART

The unwanted buildup of static electricity on an insulating support has been a continuing problem. It is well-known that a conductive layer will prevent static buildup but, while it is possible to formulate a conductive composition which can be coated on a support, it has been quite difficult to combine these conductive properties with other desirable physical properties.

The stringent physical and optical requirements for photographic elements make the formulation of suitable antistatic compositions for these elements particularly troublesome. One advantageous conductive composition is described in U.S. Pat. No. 4,070,189 to Kelly and Campbell. That patent describes a conductive layer comprising a particulate vinylbenzyl ammonium or phosphonium salt polymer in a hydrophobic binder. The conductive compositions of Kelly and Campbell, and layers formed from these compositions, are useful in providing photographic conductive elements which resist ferrotyping.

As is known in the art, useful hydrophobic binders include coalesced latices. For example, U.S. Pat. No. 4,011,176 describes an aqueous composition comprising an electroconductive resin and a latex of an organic copolymer stabilized by cationic moiety. When latices are used in the conductive layers of Kelly and Campbell, or with other known conductive polymers, they provide ferrotyping resistance over a wide range of temperature and humidity conditions. However, under extremely severe conditions, conventional latices continue to cause some residual ferrotyping. For example, when photographic elements having a conductive layer comprising a conventional latex are incubated in a ferrotyping test for 3 days at 49° C. and 70% relative humidity, some ferrotyping occurs. It would be highly desirable to use latex binders because they can be economically and safely used due to their aqueous base. We are aware of no suggestion in the art as to how conductive layers comprising latex binders can be modified to reduce substantially the problem of ferrotyping under severe conditions.

SUMMARY OF THE INVENTION

We have found that the difficult problem of ferrotyping under severe conditions can be substantially reduced by using a coating composition having a crosslinkable latex as the binder. In order to provide properly coalesced conductive latex layers using conventional drying conditions, the latex should have a glass transition temperature of 50° C. or less. Further, in order to reduce substantially the problem of ferrotyping under severe conditions, the coalesced latex must have a glass transition temperature of greater than 50° C. By providing a crosslinkable latex binder, both of these requirements are met. Thus, the latex binder is chosen so that it has a first glass transition temperature before crosslinking of less than 50° C. and a second glass transition temperature after crosslinking and coalescing of greater than 50° C.

Therefore, in one aspect of our invention, we provide a coating composition comprising:

(a) a conductive, water-dispersible particulate polymer and (b) a crosslinkable latex binder, said latex having a first glass transition temperature before crosslinking of substantially less than 50° C. and a second glass transition temperature after crosslinking and coalescing of substantially greater than 50° C. Typically, the first and second glass transition temperatures differ by more than 4° C.

In another aspect of our invention, we provide an element comprising a support having a conductive layer thereon which comprises the described coating composition wherein the latex is crosslinked and coalesced.

In preferred aspects of the present invention, the described coating composition is coated in a photographic element. Thus, in yet another aspect of the present invention, there is provided a photographic element having at least one radiation-sensitive layer and a layer comprising the coating composition of the present invention wherein the latex is crosslinked and coalesced. In particularly preferred embodiments, a hydrophilic radiation-sensitive layer is located on one side of the support and the layer comprising the coating composition of the present invention is coated on the other side of the support.

Typically, the conductive composition is coated as the outermost layer on the support. We have found, however, that the conductive layer can be overcoated with another layer and still retain its conductive properties. Thus, in preferred embodiments, the coating composition of the present invention can be overcoated with another layer of the described crosslinkable latex binder. This provides for the optimization of the surface characteristics of the element with minimal sacrifice of the conductive properties of the elements of the present invention.

The coating compositions described herein provide layers which are highly resistant to ferrotyping. Ferrotyping is caused by the sticking of a surface to a hydrophilic surface. Therefore, the conductive compositions of the present invention are useful wherever it is desired to coat elements which are resistant to sticking to hydrophilic surfaces under severe conditions of temperature and humidity. For example, photographic elements having a hydrophilic layer on one side and a conductive layer of the present invention on the other side are resistant in ferrotyping tests for 3 days at 49° C. and 70% relative humidity.

DETAILED DESCRIPTION OF THE INVENTION

The coating compositions of the present invention contain a binder which comprises a latex which has two distinct glass transition temperatures. The glass transition temperature (Tg) before crosslinking is substantially less than 50° C. and after crosslinking and coalescing is substantially greater than 50° C. Typically, the difference between the first ($Tg_1$) and second ($Tg_2$) glass transition temperatures is about 4° C. or greater. Thus, by "substantially less" and "substantially greater"

we mean that $Tg_1$ is sufficiently below 50° C. and $Tg_2$ is sufficiently above 50° C. so that they differ by about 4° C. or greater. In general, any latex having sufficient crosslinking agent to provide these glass-transition-temperature characteristics is useful in the coating compositions of the present invention. Mixtures of latices can also be used so long as the mixture has the described Tg properties.

A useful class of latex-forming polymers can be represented by the formula:

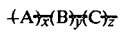

wherein A is a copolymerized α,β-ethylenically unsaturated monomer, preferably an alkyl methacrylate wherein the alkyl group contains from 4–12 carbon atoms such as butyl, isobutyl, heptyl, hexyl, lauryl and the like; B is a copolymerized α,β-ethylenically unsaturated monomer, preferably styrene or a haloalkyl methacrylate; C is a crosslinkable, copolymerized α,β-ethylenically unsaturated monomer, preferably glycidyl methacrylate; x is from about 5 to about 80 weight percent; y is from about 5 to about 80 weight percent; and z is from about 15 to about 40 weight percent.

As indicated, A and B can be the same or different and are derived from copolymerizable, α,β-ethylenically unsaturated monomers. Useful monomers of this class include ethylene, propylene, 1-butene, isobutene, 2-methylpentene, 2-methylbutene, 1,1,4,4-tetramethylbutadiene, styrene, α-methylstyrene; monoethylenically unsaturated esters of aliphatic acids such as vinyl acetate, isopropenyl acetate, allylacetate and the like; esters of ethylenically unsaturated mono- or dicarboxylic acids such as methyl methacrylate, ethyl acrylate, diethyl methylene malonate and the like; monoethylenically unsaturated compounds such as acrylonitrile, allylcyanide, and dienes such as butadiene and isoprene.

The unit C in the formula above is derived from a copolymerizable crosslinkable unit. The polymer latex should contain enough of the unit C so as to provide for the increase in the glass transition temperature when the latex is coalesced and crosslinked. Some crosslinking can be tolerated before coalescing so long as the glass transition temperature remains substantially below 50° C. and there are sufficient crosslinking sites remaining so that the glass transition temperature can be brought substantially above 50° C. by coalescing and crosslinking. A preferred class of monomers capable of forming the crosslinkable repeating unit C consists of those monomers which contain an active epoxide group such as glycidyl methacrylates and the like.

The specific monomers chosen for A, B and C, as well as the relative proportions, i.e., values for x, y and z, can depend on the desired physical properties of the final coating, the exact particulate conductive polymer chosen, and the presence or absence of any surface-active agents and the like. Using the present specification as a guide, latices having the desired properties can be formulated by simple experiment. Generally, it is desirable that the coating composition containing the cross-linkable latex and the particulate conductive polymer be substantially clear. Thus, it is desirable to select the particular monomers A, B and C, as well as the relative portions of these polymers, so that the resulting coating composition forms clear coatings. Clear coatings can be formed, for example, when A is an alkyl methacrylate wherein the alkyl group contains from 4–12 carbon atoms, B is styrene or a haloalkyl methacrylate, and C is glycidyl methacrylate or glycidyl acrylate. Clear coatings are formed when these monomers are used and the values of x, y and z are between 25–65, 15–50 and 15–35, respectively.

Procedures for producing the crosslinkable latex binders of the present compositions will be readily apparent to those skilled in the art. The latices employed herein can be formed, for example, using conventional free radical polymerization techniques for forming organic polymer hydrosols. Typically, the aqueous latex with the polymer particles distributed therein can be conveniently formed by charging into water the various monomers necessary to form the desired crosslinkable latex. Added to this dispersion or solution are minor amounts of ingredients such as polymerization initiators, surfactants to disperse the monomers, etc. The proportions in which the monomers are charged into the water-reaction mixture will determine approximately the proportions of the repeating units in the resulting latex polymer particles. The latex composition produced by this method can be used directly or, optionally, some or all of the materials added to promote polymerization can be removed by dialysis, ultrafiltration or other methods known in the art for removing low-molecular-weight materials from polymeric materials. Exemplary useful free radical polymerization techniques which can be employed in producing the hydrophobic crosslinkable latices which can be used in the compositions of the present invention are described in U.S. Pat. Nos. 2,914,499, 3,033,833 and 3,547,899 and Canadian Pat. No. 704,778.

Illustrative latex binders containing crosslinkable polymer particles are those set forth below. The numbers in the parentheses following the polymer name represent the weight ratio of the monomers polymerized to form the monomers (i.e., values for x, y and z). The data for $Tg_1$ represents the initial Tg of the polymer and for $Tg_2$ the Tg after coalescing and crosslinking.

|  |  | $Tg_1$ | $Tg_2$ |
|---|---|---|---|
| (a) | poly(n-lauryl methacrylate-co-2-chloroethyl methacrylate-co-glycidyl methacrylate) (31/49/20) | 41 | 70 |
| (b) | poly(nlauryl methacrylate-co-2-chloroethyl methacrylate-co-glycidyl methacrylate) (33/47/20) | 49 | 67 |
| (c) | poly(n-lauryl methacrylate-co-2-chloroethyl methacrylate-co-glycidyl methacrylate) (30/50/20) | 46 | 64 |
| (d) | poly(n-butyl methacrylate-co-styrene-co-glycidyl methacrylate) (60/20/20) | 47 | 52 |
| (e) | poly(n-butyl methacrylate-co-styrene-co-glycidyl methacrylate) (62/20/18) | 47 | 51 |
| (f) | poly(n-butyl methacrylate-co-styrene-co-glycidyl methacrylate) (50/30/20) | 45 | 68 |

The described latex binders form useful coating compositions when mixed with a conductive, water-dispersible, particulate polymer. The conductive polymers of this type are well-known and any of the large number of these polymers can be used. Useful conductive, water-dispersible, particulate polymers are described, for example, in U.S. Pat. Nos. 3,399,995 by Winchell, 3,011,918 by Silvernail, 3,674,711 by Growald, and the like. Mixtures of particulate conductive polymers can also be used.

Preferred conductive polymers which are useful in the compositions of the present invention are described in U.S. Pat. No. 4,070,189 by Kelley and Campbell, which is hereby incorporated by reference. These conductive polymers are water-dispersible, particulate vinylbenzyl quaternary ammonium or phosphonium salt polymers. These particulate polymers can be represented by the formula:

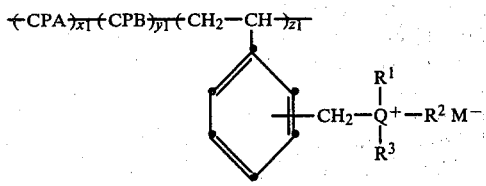

wherein:
CPA is a polymerized monomer containing at least two ethylenically unsaturated groups;
CPB is a polymerized copolymerizable, $\alpha,\beta$-ethylenically unsaturated monomer;
Q is N or P;
$R^1$, $R^2$ and $R^3$ are independently selected from the group consisting of carbocyclic, alkyl, aryl and aralkyl, and wherein $R^1$, $R^2$ and $R^3$ together can form the atoms necessary to complete a heterocyclic ring with Q, such as pyridinium;
$M^-$ is an anion;
$x_1$ is from about 0.1 to about 20 mole percent;
$y_1$ is from about 0 to about 90 mole percent; and
$z_1$ is from about 10 to about 99 mole percent.

Particularly preferred conductive polymers useful in the compositions of this invention comprise units having the formula above wherein CPA is a repeating unit of an addition polymerizable monomer containing at least 2 ethylenically unsaturated groups such as vinyl groups generally having the structure:

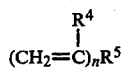

wherein n is an integer greater than 1 and preferably 2 or 3; $R^4$ is selected from hydrogen and methyl; and $R^5$ is a linking group comprising 1 or more condensation linkages such as an amide, a sulfonamide, an ester such as sulfonic acid ester and the like, or a condensation linkage and an organic nucleus, including an alkylene group such as methylene, ethylene and trimethylene; an arylene group, such as phenylene and others such as phenylenedi(oxycarbonyl), 4,4'-isopropylidene bis(-phenyleneoxycarbonyl), methylenedi(oxycarbonyl), ethylenedi(carbonyl), 1,2,3-propanetriyltris(oxycarbonyl), cyclohexylenebis(methyleneoxycarbonyl), methyleneoxymethylenedi(carbonyloxy), ethylenebis(oxyethyleneoxycarbonyl), ethylidyne trioxycarbonyl and the like. The monomer (CPA) used must be stable in the presence of strong alkali and must not be highly reactive so that substantial hydrolysis does not oocur during copolymerization.

Suitable examples of monomers from which the repeating units (CPA) are formed are divinylbenzene, allyl acrylate, allyl methacrylate, N-allylmethacrylamide, 4,4'-isopropylidenediphenylene diacrylate, 1,3-butylene diacrylate, 1,3-butylene dimethacrylate, 1,4-cyclohexylenedimethylene dimethacrylate, diethylene glycol dimethacrylate, diisopropylidene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'-methylenebisacrylamide, 2,2-dimethyl-1,3-trimethylene dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidyne triacrylate, vinyl allyloxyacetate, vinyl methacrylate, 1-vinyloxy-2-allyloxyethane and the like. Ethylene glycol dimethacrylate is a particularly preferred monomer. When the conductive copolymer is formed containing the unit CPA as described, the copolymer spontaneously cross-links, thereby producing a water-dispersible, particulate conductive polymer.

CPB is a unit of a copolymerizable $\alpha,\beta$-ethylenically unsaturated monomer (including two, three or more units) such as ethylene, propylene, 1-butene, isobutene, 2-methylpentene, 2-methylbutene, 1,1,4,4-tetramethylbutadiene, styrene and $\alpha$-methylstyrene; monoethylenically unsaturated esters of aliphatic acids such as vinyl acetate, isopropenyl acetate, allyl acetate, etc.; esters of ethylenically unsaturated mono- or dicarboxylic acids such as methyl methacrylate, ethyl acrylate, diethyl methylenemalonate, etc.; and monoethylenically unsaturated compounds such as acrylonitrile, allyl cyanide and dienes such as butadiene and isoprene. A preferred class of ethylenically unsaturated monomers which maybe used to form the ethenic polymers of this invention includes the lower 1-alkenes having from 1-6 carbon atoms, styrene and tetramethylbutadiene and methyl methacrylate.

Each of $R^1$, $R^2$ and $R^3$ is an independent group selected from the group consisting of carbocyclic groups preferably containing from 3-10 carbon atoms including aryl, aralkyl and cycloalkyl such as benzyl, phenyl, p-methylbenzyl, cyclohexyl, cyclopentyl and the like, and alkyl groups preferably containing from 1-20 carbon atoms, such as methyl, ethyl, propyl, isobutyl, pentyl, hexyl, heptyl, decyl and the like. In the preferred embodiment, $R^1$, $R^2$ and $R^3$ are methyl.

$M^-$ is an anion, i.e., a negative salt forming an anionic radical or atom such as a halide (e.g., bromide or chloride), sulfate, alkyl sulfate, alkane or arene sulfonate (e.g., a p-toluenesulfonate), acetate, phosphate, dialkyl phosphate or similar anionic moiety.

Q is N or P and $x_1$ is from about 1 to about 20 mole percent and preferably from about 5-10 mole percent, $y_1$ is from about 0 to about 90 mole percent and preferably from about 0 to 45 mole percent and $z_1$ is from about 10 to about 99 mole percent, preferably from about 40-99 mole percent.

The conductive polymers useful in the compositions of this invention can be prepared by emulsion-polymerizing a vinylbenzyl halide with a polyunsaturated monomer CPA as described above and an $\alpha,\beta$-ethylenically unsaturated monomer CPB as described above, generally in the presence of an anionic surfactant such as sodium lauryl sulfate, or

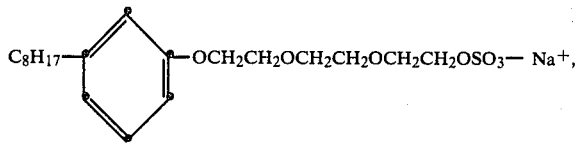

the sodium salt of a sulfated condensate of an alkylphenol and ethylene oxide (Alipal TM from General Dyestuff Corp), and the like and a redox free-radical initiator such as potassium persulfate-sodium bisulfite, potassium persulfate-$Fe^{+2}$, $H_2O_2$-$Fe^{+2}$ and the like. This process is described, for example, in U.S. Pat. No. 3,072,588.

The above polymeric vinylbenzyl halide latex can be reacted with a tertiary imine or tertiary phosphine having the structure:

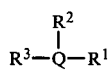

wherein $R^1$, $R^2$, $R^3$ and Q are as described above, generally at temperatures of from about −20° C. to about 150° C. This produces a conductive polymeric microgel latex which has a particular character.

Specific preferred conductive polymers are described by Kelly and Campbell in above-referenced U.S. Pat. No. 4,070,189 at Table I in col 6–7 and col 6 at lines 41–52. The currently preferred conductive polymer is poly(N-vinylbenzyl-N,N,N-trimethylammonium chloride-coethylene glycol dimethacrylate) (93/7 molar percent).

The term "water-dispersible polymers" as used throughout the specification in relation to the conductive polymers includes polymers which appear as a clear or slightly cloudy solution on visual inspection, but which can be seen to be in particulate dispersion form when examined under an electron microscope. These water-dispersible particulate polymers generally have a particle-size range of from about 0.04 micron to about 0.15 micron. By "particulate" we mean particles falling within this size range. In the preferred embodiment, a particle size range of from 0.06 micron to 0.12 micron is used.

A significant feature of the compositions of the present invention is that they are capable of forming haze-free coatings. Whether such a coating will be formed depends upon the particular support, the particular crosslinkable latex binder in the coating composition and the particular conductive polymer chosen. The determination of the suitability of the combination to form haze-free coatings can be determined by the following simple experiment. A coating composition is prepared using 4 parts of the chosen latex binder to 1 part of the chosen conductive polymer. Sufficient water is added to form a latex coating composition which is about 2.0–2.5 percent by weight solids. Solids include both the latex binder and the particulate conductive polymer. The resulting coating composition is then hand-coated to a coverage of about 1–2 g/m² on the chosen support, and the latex binder is coalesced. It may be desirable to heat the coated composition moderately so as to insure that the latex binder is crosslinked. Heating to about 90° C. for about 2 min is usually sufficient. Visual inspection of the dried coating is usually sufficient to determine the suitability of the combination.

Alternatively, the haze may be determined by measuring the amount of scattered light on a spectrophotometer and the composition is considered substantially haze-free if the haze is less than 1 percent. The illustrative crosslinkable latex binders (a)–(f) meet these tests when used with the preferred conductive polymer, poly(n-vinylbenzyl-N,N,N-trimethylammonium chloride-co-ethylene glycol dimethacrylate) (93/7 molar percent) when coated on either poly(ethylene terephthalate) or cellulose acetate support.

The weight ratio of the crosslinkable latex particles to the conductive polymer in the coating composition, and therefore the coatings themselves, can vary over a wide range. A useful range of the weight ratio of the latex binder to conductive polymer is between about 5:1 to 0.5:1. The exact ratio of these components will depend upon a balancing of the desired conductivity and the desired physical properties of the coated layer. As the amount of binder is increased, for example, generally the adhesion to the support and the scratch resistance and other physical properties are improved. However, as this ratio is increased the conductivity of the resulting coating generally decreases. Particularly desirable layers and coating compositions are formed when this ratio is between 4:1 and 1:1.

In addition to the conductive polymer, the crosslinkable latex and water, the coating composition can contain other components. For example, the composition can contain surfactants, coating aids, lubricants, matting agents, other solvents and the like. One useful component is a coalescing aid such as 2-(2-butoxyethoxyethyl)acetate. While this and other coalescing aids can be used, it is an advantage of the present invention that they are not necessary. Coalescing aids reduce the Tg of the latex, making it easier to coalesce. However, care must be taken to remove the aid from the coalesced layer in order to achieve the desired Tg for the coalesced layer. By providing a crosslinkable latex, we avoid the need for this precaution under most circumstances. Other useful coalescing aids are known in the art and are described, for example, by K. L. Hoy, J. Paint Techn., 45, 51–56 (1973).

The weight percent solids in the coating composition of the present invention can vary widely. As is well-known in the art, the percent solids, along with the method of coating, has a substantial influence on the coverage of the layer which results from the coalescence of the coating composition. A useful range for the weight percent solids in the coating composition is between about 1.0 percent to about 5.0 percent.

The described coating compositions can be coated on a wide variety of supports to form useful conducting elements. The support can be a number of materials which can take a number of forms. For example, the coating compositions described herein can be coated on polymeric materials such as poly(ethylene terephthalate), cellulose acetate, polystyrene, poly(methyl methacrylate) and the like. The compositions can also be coated on other supports such as glass, paper including resin-coated paper, and metals. Fibers, including synthetic fibers, useful for weaving into cloth, can be used as the support. Planar supports such as polymeric films useful in photography are particularly useful. In addition, the compositions of the present invention can be coated onto virtually any article where it is desired to have a conductive coating. For example, The compositions can be coated on small plastic parts to prevent the unwanted buildup of static electricity, or coated on small polymeric spheres or other shapes such as those used for toners in electrophotography and the like.

The compositions of the present invention can be coated onto the support using any suitable method. For example, the compositions can be coated by spray coating, fluidized bed coating, dip coating, doctor blade coating or extrusion hopper coating, to mention but a few.

The described coating compositions can be coated at a wide range of coverages. Depending on the particular components and their ratio, useful conductive layers are formed at coverages of about 0.25 g/m$^2$ to about 10 g/m$^2$. Coverage refers to the coverage of the conductive polymer and the latex binder, exclusive of solvent and other volatile addenda.

As noted previously, the latex binders of the compositions of the present invention have a glass transition temperature before coalescing of substantially less than about 50° C. These latices contain sufficient crosslinking units so that the glass transition temperature after coalescing and crosslinking is substantially above 50° C. Measurement of these glass transition temperatures can be made by methods which are well-known in the art. (See, for example, *Techniques and Methods of Polymer Evaluation*, Vol. 1, Marcel Dekker, Inc, NY, N.Y.) One particularly suitable method is described as follows. Approximately 10 mg of the polymer to be tested is placed in an aluminum sample pan. The sample is heated at a rate of 10° C./min in a thermal analyzer equipped with a differential scanning colorimetry cell. On the first heating of the sample, the glass transition temperature ($Tg_1$) is taken as the temperature of the midpoint of the specific heat interval associated with the transition of the polymer to its glassy state. This initial heating also serves to coalesce and crosslink the polymer. The sample is cooled to well below $Tg_1$ and heated again at a rate of 10° C./min, again measuring the Tg. Heating and cooling in this manner is repeated until a constant Tg for the coalesced polymer is reached. This is recorded as $Tg_2$.

The coating compositions of the present invention form useful conductive coatings by coalescing and crosslinking the crosslinkable latex which has dispersed therein the conductive polymer. Typically, coalescence occurs by simply allowing the continuous aqueous phase of the latex to evaporate. In some instances, depending upon the exact nature of the polymer particles in the latex, it may be necessary to heat the coated composition for a short period to coalesce and crosslink the latex binder. As in the haze test described above, heating to a temperature of at least about 90° C. for about 2 min is typically sufficient to coalesce and crosslink the binder, although other temperatures and times are useful.

The coating compositions of the present invention are particularly useful in forming antistatic layers for photographic elements or conductive layers in electrophotographic elements. The compositions of the present invention provide layers having high conductivity and at the same time layers which resist ferrotyping. Photographic elements comprise a support having coated thereon at least one radiation-sensitive layer. The described conductive layers may be coated in any of a wide variety of locations in the photographic element. For example, the conductive layer may be between the support and the radiation-sensitive layer or layers. In a preferred embodiment of the photographic elements of the present invention, the radiation-sensitive layers, with an outermost hydrophilic layer, are coated on one side of the photographic support while the conductive compositions of the invention are coated on the other side of the support. In this configuration, the photographic element can be rolled on itself and subjected to conditions of high temperature and high humidity for substantial periods of time without the formation of ferrotyping on the hydrophilic, radiation-sensitive side of the support. The radiation-sensitive layer may itself be the hydrophilic layer, or the layer may be overcoated with a separate hydrophilic layer. This outermost hydrophilic layer can also contain a variety of addenda such as matting agents, antifoggants, plasticizers, haze-reducing agents and the like. The outermost hydrophilic layer, which can be the radiation-sensitive layer, can comprise any of a large number of water-permeable hydrophilic polymers. Typical hydrophilic polymers include gelatin, albumin, poly(vinyl alcohols), hydrolyzed cellulose esters and the like.

The radiation-sensitive layer or layers of the photographic or electrophotographic elements of the present invention can take a wide variety of forms. The layers can comprise photographic silver salt emulsions, such as silver halide emulsions; diazo-type compositions; vesicular image-forming compositions; photopolymerizable compositions; electrophotographic compositions comprising radiation-sensitive semiconductors; and the like. Photographic silver halide emulsions are particularly preferred and are described, for example, in *Product Licensing Index*, Publication 9232, Vol 92, Dec, 1971, pp 107-110.

The conductive compositions of the present invention can be coated directly on the side of the support opposite the hydrophilic, radiation-sensitive layers, or may be coated over a wide variety of subbing layers known in the art. Typical subbing layers include copoly(vinylidene chloride-acrylonitrile-acrylic acid), cellulose nitrate and other cellulose derivatives.

In many instances, it is desirable to overcoat the conducting layers of the present invention with additional latex. The latex which is used for the overcoat can be either the same latex which is used as the binder for the conductive layer or a different crosslinkable latex as described herein. It has been found that overcoating the conductive layer with this overcoat of the described latices does not seriously affect the conductivity of the resulting element. Thus, the conductive layer can be optimized for such properties as the adhesion to the subbing material and conductivity, while the overcoat can be optimized for other physical characteristics such as abrasion resistance and the like. Generally, the coverage of the overcoat can be approximately the same as the coverage of the conductive layer itself, although the coverage for this layer can vary widely.

The following preparations and examples are presented to illustrate the invention.

Preparation of poly(n-lauryl methacrylate-co-2-chloroethyl methacrylate-co-glycidyl methacrylate) (33/47/20)

In a reactor was prepared a solution containing 6.25 g of the surfactant, hexadecyltrimethylammonium bromide, 20.85 g of a 30% solution Olin 10G TM surfactant and 713 g of deoxygenated water. This solution was heated to 65° C. and stirred under nitrogen for 15 min. Two header tanks were prepared and fitted to the reactor. One tank contained 82.5 g n-lauryl methacrylate, 117.5 g 2-chloroethyl methacrylate and 50.0 of glycidyl methacrylate. The second tank contained a solution of 1.25 g of the initiator 2,2'-azobis-(2-amidinopropane).2HCl in 250 g of deoxygenated water. The contents of the header tanks were added to the reactor over a period of 3 h. After the addition was complete, the reactor contents were stirred an additional 2.5 h. Then, 0.1 g of the initiator was added to the reactor and the reaction was continued for 0.5 h. The resulting latex in the reactor was cooled, filtered, dialyzed against distilled water for 6 h and again filtered. A sample of this latex was coalesced to a clear film having a refractive index of 1.540.

The described preparation produces illustrative latex binder (b) referenced above. By analogous procedures, illustrative latex binders (a)–(f) were prepared.

EXAMPLES 1–2

Aqueous dispersions of the conductive polymer poly(N-vinylbenzyl-N,N,N-trimethylammonium chloride-coethylene glycol dimethacrylate) (93/7 molar percent) and latex binders were prepared. In each case, the weight ratio of binder to conductive polymer was 4:1. These coating compositions were coated on poly(ethylene terephthalate) support over a vinylidene chloride polymer subbing layer at a coverage of 0.37 g/m$^2$. Each composition produced substantially clear coatings which, in comparison with an uncoated sample, were at least as resistant to scratching. The results of these experiments are tabulated below in Table 1. The referenced ferrotyping test is described in the previously referenced U.S. Pat. No. 4,070,189 at col 11.

TABLE 1

| Example | Binder | Surface Resistivity ohms/sq × 10$^{10}$ @ 70° F. 50% RH | Ferrotyping 3 days 49° C. 50% RH | 7 Days 38° C. 50% RH | 3 days 49° C. 70% RH |
|---|---|---|---|---|---|
| 1 | (a) | 0.8 | OK | OK | OK |
| 2 | (b) | 0.6 | OK | OK | OK |

EXAMPLES 3–20

Coating compositions were prepared using the conductive polymer of Examples 1–2 and various latex binders. The ratio of binder to conductive polymer was also varied. These coating compositions were coated as in Examples 1–2 on subbed poly(ethylene terephthalate) support at a coverage of about 0.3 g/m$^2$. Two samples of each coating were prepared. One of these samples was overcoated with the same polymer used as the binder for the conductive layer. The overcoat was also coated at a coverage of about 0.3 g/m$^2$. All samples were subjected to the 3-day, 49° C., 50%-RH ferrotyping test and produced no ferrotyping. At 49° C., 70% RH, for 3 days, binder c produced no ferrotyping, while binders d and e produced only slight ferrotyping. The results are presented in Table 2.

TABLE 2

| Example | Binder | Overcoat | Binder/Conductive Polymer | Surface Resistivity ohm/sq |
|---|---|---|---|---|
| 3 | (d) | no | 4:1 | 1 × 10$^8$ |
| 4 | (d) | yes | 4:1 | 3.2 × 10$^8$ |
| 5 | (e) | no | 4:1 | 1.2 × 10$^8$ |
| 6 | (e) | yes | 4:1 | NA |
| 7 | (e) | no | 2:1 | 1.3 × 10$^8$ |
| 8 | (e) | yes | 2:1 | 1.9 × 10$^8$ |

TABLE 2-continued

| Example | Binder | Overcoat | Binder/Conductive Polymer | Surface Resistivity ohm/sq |
|---|---|---|---|---|
| 9 | (e) | no | 1:1 | 3 × 10$^7$ |
| 10 | (e) | yes | 1:1 | 1.4 × 10$^8$ |
| 11 | (e) | no | 0.5:1 | 6 × 10$^6$ |
| 12 | (e) | yes | 0.5:1 | 6 × 10$^6$ |
| 13 | (c) | no | 4:1 | 6 × 10$^7$ |
| 14 | (c) | yes | 4:1 | 9 × 10$^7$ |
| 15 | (c) | no | 2:1 | 1.9 × 10$^8$ |
| 16 | (c) | yes | 2:1 | 5.2 × 10$^8$ |
| 17 | (c) | no | 1:1 | 2 × 10$^7$ |
| 18 | (c) | yes | 1:1 | 1.6 × 10$^8$ |
| 19 | (c) | no | 0.5:1 | 1 × 10$^7$ |
| 20 | (c) | yes | 0.5:1 | 2 × 10$^7$ |

EXAMPLE 21

A coating composition was prepared using the conductive polymer of Examples 1–2 and latex binder (c). The binder-to-conductive-polymer ratio was 4:1. This coating composition was coated at a coverage of about 0.3 g/m$^2$ on gel subbed cellulose acetate support. The surface resistivity of the coated support was 8 × 10$^9$ ohm/sq.

EXAMPLE 22

This is a comparative example.

A coating composition was prepared as in Example 1 except that the binder was poly(n-lauryl methacrylate-co-2-chloroethyl methacrylate-co-2-acetoacetoxyethyl methacrylate) 40/30/30. In spite of the acetoacetoxyethyl methacrylate crosslinking unit, this polymer had a Tg$_1$ of 31° C. and a Tg$_2$ of 29° C. The coatings made from this coating composition had good conductivity and exhibited no ferrotyping in the tests at 50% RH. This further confirms that latex binders are good hydrophobic binders according to U.S. Pat. No. 4,070,189. However, these coatings, when tested under the severe conditions of 70% RH 49° C. for 3 days, exhibited unacceptable ferrotyping.

The invention has been described in detail with particular reference to preferred embodiments, but it will be understood that variations and modifications can be effected without departing from the spirit and scope of the invention.

We claim:

1. A coating composition comprising a mixture of at least two different polymers:
   a. a first polymer which is a conductive, water-dispersible, particulate polymer and
   b. a second polymer which is a crosslinkable latex polymer binder, represented by the formula:

—(A)$_x$(B)$_y$(C)$_z$ 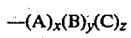

wherein A is an alkyl methacrylate, B is styrene or a haloalkyl methacrylate and C is derived from a monomer which contains an active epoxide group; x is from about 5 to about 80 weight percent; y is from about 5 to about 80 weight percent; and z is from about 15 to about 40 weight percent; said latex polymer having a first glass transition temperature before crosslinking of substantially less than 50° C. and a second glass transition temperature after crosslinking and coalescing of substantially greater than 50° C.

2. A coating composition according to claim 1 wherein A is selected from the group consisting of n-lauryl methacrylate nd n-butyl methacrylate, B is selected from the group consisting of styrene and 2-chloroethyl methacrylate, and C is glycidyl methacrylate.

3. A coating composition according to claim 2 wherein x is between 25 and 65 weight percent, y is between 25 and 65 weight percent and z is between 15 and 35 weight percent.

4. A coating composition comprising a mixture of at least two different polymers:
   a. a first polymer which is a conductive, water-dispersible, particulate polymer is represented by the formula:

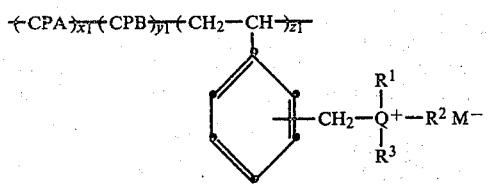

wherein:
CPA is a polymerized monomer containing at least two ethylenically unsaturated groups;
CPB is a polymerized copolymerizable, $\alpha,\beta$-ethylenically unsaturated monomer;
Q is N or P;
$R^1$, $R^2$ and $R^3$ are independently selected from the group consisting of carbocyclic, alkyl, aryl and aralkyl, and wherein $R^1$, $R^2$ and $R^3$ together can form the atoms necessary to complete a heterocyclic ring with Q;
M is an anion;
$x_1$ is from about 0.1 to about 20 mole percent;
$y_1$ is from about 0 to about 90 mole percent; and
$z_1$ is from about 10 to about 99 mole percent; and
   b. a second polymer which is a crosslinkable latex selected from the group consisting of poly(n-lauryl methacrylate-co-2-chloroethyl methacrylate-co-glycidyl methacrylate) and poly(n-butyl methacrylate-co-styrene-co-glycidyl methacrylate);
said latex polymer having a first glass transition temperature before crosslinking of substantially less than 50° C. and a second glass transition temperature after crosslinking and coalescing of substantially greater than 50° C.

5. A coating composition according to claim 4 wherein said conductive polymer is poly(n-vinylbenzyl-N,N,N-trimethylammonium chloride-co-ethylene glycol dimethacrylate) (93/7 molar percent).

6. An element comprising a support having coated thereon a conductive layer comprising a mixture of at least two different polymers:
   a. a first polymer which is a conductive, water-dispersible, particulate polymer and
   b. a second polymer which is a coalesced and crosslinked latex polymer binder,
said latex polymer having a first glass transition temperature before crosslinking of substantially less than 50° C. and a second glass transition temperature after crosslinking and coalescing of substantially greater than 50° C.

7. An element according to claim 6 wherein said latex binder comprises polymers represented by the formula:

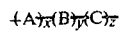

wherein A and B can be the same or different and are copolymerized, $\alpha,\beta$-ethylenically unsaturated monomers; C is a crosslinkable, copolymerized, $\alpha,\beta$-ethylenically unsaturated monomer; x is from about 5 to about 80 weight percent; y is from about 5 to about 80 weight percent; and z is from about 15 to about 40 weight percent.

8. An element according to claim 7 wherein A is an alkyl methacrylate, B is styrene or a haloalkyl methacrylate and C is derived from a monomer which contains an active epoxide group.

9. An element according to claim 8 wherein A is selected from the group consisting of n-lauryl methacrylate and n-butyl methacrylate, B is selected from the group consisting of styrene and 2-chloroethyl methacrylate, and C is glycidyl methacrylate.

10. An element according to claim 9 wherein x is between 25 and 65 weight percent, y is between 25 and 65 weight percent and z is between 15 and 35 weight percent.

11. An element according to claim 6 wherein said conductive, water-dispersible, particulate polymer is represented by the formula:

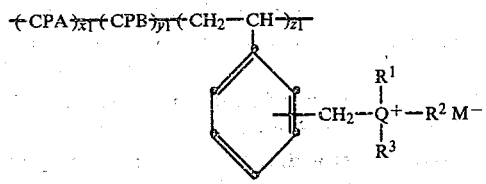

wherein:
CPA is a polymerized monomer containing at least two ethylenically unsaturated groups;
CPB is a polymerized copolymerizable, $\alpha,\beta$-ethylenically unsaturated monomer;
Q is N or P;
$R^1$, $R^2$ and $R^3$ are independently selected from the group consisting of carbocyclic, alkyl, aryl and aralkyl, and wherein $R^1$, $R^2$ and $R^3$ together can form the atoms necessary to complete a heterocyclic ring with Q;
M is an anion;
$x_1$ is from about 0.1 to about 20 mole percent;
$y_1$ is from about 0 to about 90 mole percent; and
$z_1$ is from about 10 to about 99 mole percent.

12. An element according to claim 11 wherein said conductive polymer is poly(N-vinylbenzyl-N,N,N-trimethylammonium chloride-co-ethylene glycol dimethacrylate) (93/7 molar percent).

13. An element according to claim 11 wherein said crosslinkable latex is selected from the group consisting of poly(n-lauryl methacrylate-co-2-chloroethyl methacrylate-co-glycidyl methacrylate) and poly(n-butyl methacrylate-co-styrene-co-glycidyl methacrylate).

14. An element according to claim 6 wherein said conductive layer is overcoated with a coalesced and crosslinked layer of said latex binder.

15. A photographic element comprising a support having coated thereon a radiation-sensitive layer and a conductive layer comprising a mixture of at least two different polymers:
   a. a first polymer which is a conductive, water-dispersible, particulate polymer and b. a second polymer which is a coalesced and crosslinked latex polymer binder,
said latex having a first glass transition temperature before crosslinking of substantially less than 50° C. and a second glass transition temperature after crosslinking and coalescing of substantially greater than 50° C.

16. A photographic element according to claim 15 having a hydrophilic layer as the outermost layer on one side of said support and having said conductive layer on the other side of said support.

17. A photographic element according to claim 16 wherein said conductive layer is overcoated with a coalesced and crosslinked layer of said latex binder.

18. An element according to claim 15 wherein said latex binder comprises polymers represented by the formula:

wherein A and B can be the same or different and are copolymerized, α,β-ethylenically unsaturated monomers; C is a crosslinkable, copolymerized, α,β-ethylenically unsaturated monomer; x is from about 5 to about 80 weight percent; y is from about 5 to about 80 weight percent; and z is from about 15 to about 40 weight percent.

19. An element according to claim 18 wherein A is an alkyl methacrylate, B is styrene or a haloalkyl methacrylate and C is derived from a monomer which contains an active epoxide group.

20. An element according to claim 19 wherein A is selected from the group consisting of n-lauryl methacrylate and n-butyl methacrylate, B is selected from the group consisting of styrene and 2-chloroethyl methacrylate, and C is glycidyl methacrylate.

21. An element according to claim 20 wherein x is between 25 and 65 weight percent, y is between 25 and 65 weight percent and z is between 15 and 35 weight percent.

22. An element according to claim 15 wherein said conductive, water-dispersible, particulate polymer is represented by the formula:

$$-(CPA)_{x_1}-(CPB)_{y_1}-(CH_2-CH)_{z_1}-$$

with a pendant phenyl group bearing $-CH_2-Q^+-R^2 \, M^-$ substituted with $R^1$ and $R^3$ on Q.

wherein:
CPA is a polymerized monomer containing at least two ethylenically unsaturated groups;
CPB is a copolymerized copolymerizable, α,β-ethylenically unsaturated monomer;
Q is N or P;
$R^1$, $R^2$ and $R^3$ are independently selected from the group consisting of carbocyclic, alkyl, aryl and aralkyl, and wherein $R^1$, $R^2$ and $R^3$ together can form the atoms necessary to complete a heterocyclic ring with Q;
M is an anion;
$x_1$ is from about 0.1 to about 20 mole percent;
$y_1$ is from about 0 to about 90 mole percent; and
$z_1$ is from about 10 to about 99 mole percent.

23. An element according to claim 22 wherein said conductive polymer is poly(n-vinylbenzyl-N,N,N-trimethylammonium chloride-co-ethylene glycol dimethacrylate (93/7 molar percent).

24. A method for forming a conductive layer on a support comprising the steps of:
a. coating said support with a coating composition comprising a mixture of at least two different polymers:
i. a first polymer which is a conductive, waterdispersible, particulate polymer and
ii. a second polymer which is a crosslinkable latex polymer binder,
said latex having a first glass transition temperature before crosslinking of substantially less than 50° C. and a second glass transition temperature after crosslinking and coalescing of substantially greater than 50° C.; and
b. coalescing and crosslinking said latex binder.

25. A method according to claim 24 wherein said coalescing and crosslinking step comprises heating said layer to at least about 90° C. for about 2 minutes.

* * * * *